(12) United States Patent
Jiang et al.

(10) Patent No.: US 8,237,672 B2
(45) Date of Patent: *Aug. 7, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 631 days.

This patent is subject to a terminal disclaimer.

(21) Appl. No.: 12/286,176

(22) Filed: Sep. 29, 2008

(65) Prior Publication Data

US 2009/0153509 A1 Jun. 18, 2009

(30) Foreign Application Priority Data

Dec. 14, 2007 (CN) .......................... 2007 1 0125117

(51) Int. Cl.
*G06F 3/041* (2006.01)

(52) U.S. Cl. ........ 345/173; 313/582; 313/336; 428/339; 257/222

(58) Field of Classification Search .................. 345/173; 524/496; 257/222; 349/12; 313/336; 428/339
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).

(Continued)

*Primary Examiner* — Peter Macchiarolo
*Assistant Examiner* — Mary Ellen Bowman
(74) *Attorney, Agent, or Firm* — Altis Law Group, Inc.

(57) ABSTRACT

An exemplary touch panel includes a substrate, transparent conductive layers, a capacitive sensing circuit, and conductive wires. The transparent conductive layers are disposed on a surface of the substrate and spaced apart from each other. Each transparent conductive layer includes a carbon nanotube layer. The carbon nanotube layer includes carbon nanotubes. The conductive wires respectively electrically connect the transparent conductive layers to the capacitive sensing circuit. A display device using the touch panel is also provided.

15 Claims, 6 Drawing Sheets

U.S. PATENT DOCUMENTS

| | | | |
|---|---|---|---|
| 7,084,933 B2 * | 8/2006 | Oh et al. | 349/12 |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1 * | 7/2003 | Yu | 345/173 |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kavase et al. | |
| 2005/0209392 A1 * | 9/2005 | Luo et al. | 524/496 |
| 2006/0010996 A1 | 1/2006 | Jordan et al. | |
| 2006/0022221 A1 * | 2/2006 | Furukawa et al. | 257/222 |
| 2006/0044284 A1 | 3/2006 | Tanabe | |
| 2006/0077147 A1 | 4/2006 | Palmateer et al. | |
| 2006/0097991 A1 * | 5/2006 | Hotelling et al. | 345/173 |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 * | 12/2006 | Spath et al. | 345/173 |
| 2006/0274049 A1 | 12/2006 | Spath et al. | |
| 2006/0275956 A1 * | 12/2006 | Konesky | 438/128 |
| 2006/0278444 A1 | 12/2006 | Binstead | |
| 2007/0065651 A1 | 3/2007 | Glatkowski et al. | |
| 2007/0075619 A1 * | 4/2007 | Jiang et al. | 313/336 |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 * | 12/2007 | Hata et al. | 428/339 |
| 2008/0029292 A1 | 2/2008 | Takayama et al. | |
| 2008/0088219 A1 | 4/2008 | Yoon et al. | |
| 2008/0129666 A1 | 6/2008 | Shimotono et al. | |
| 2008/0138589 A1 | 6/2008 | Wakabayashi et al. | |
| 2008/0192014 A1 * | 8/2008 | Kent et al. | 345/173 |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |

| | | |
|---|---|---|
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | W02006031981 | 3/2006 |
| WO | WO2006030981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Mei Zhang etal., "Strong Transparent, Multifunctional, Carbon Nanotube Sheets", SCIENCE, America, AAAS, vol. 309, pp. 1215-1219, Aug. 19, 2005.

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

George Gruner, "Carbon Nanonets Spark New Electronics", SCIENTIFIC AMERICAN, pp. 76-83, May 2007.

Yoshikazu Nakayama, "Technology Development of CNT Long Yarns and CNT Sheets", Nano Carbon Handbook, Japan TSB INC, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Yu Xiang, Technique of Touch Panel & the Production of Resistance-type Touch Panel Insulation Dot, Journal of Longyan Teachers College, p. 25-26, vol. 22, No. 6, 2004.

Fan et al. "Self-Oriented Regular Arrays of Carbon Nanotubes and Their Field Emission Properties". Science, vol. 283, (1999); pp. 512-514.

Wu et al."Transparent, Conductive Carbon Nanotube Films". Science,vol. 305,(2004);pp. 1273-1276.

Susuki et al. "Investigation of physical and electric properties of silver pastes as binder for thermoelectric materials". Review of Scientific Instruments,76,(2005);pp. 023907-1 to 023907-5.

ASM Handbook."Volume 2 Properties and Selection: Nonferrous Alloys and Special-Purpose Materials".Apr. 2007; pp. 840-853.

* cited by examiner

1
TOUCH PANEL AND DISPLAY DEVICE USING THE SAME

RELATED APPLICATIONS

This application is related to commonly-assigned applications entitled, "TOUCH PANEL", Ser. No. 12/286,266, filed Sep. 29, 2008; "TOUCH PANEL AND DISPLAY DEVICE USING THE SAME", Ser. No. 12/286,181, filed Sep. 29, 2008; "TOUCH PANEL AND DISPLAY DEVICE USING THE SAME", Ser. No. 12/286,154, filed Sep. 29, 2008; "TOUCH PANEL AND DISPLAY DEVICE USING THE SAME", Ser. No. 12/286,189, filed Sep. 29, 2008; "TOUCH PANEL", Ser. No. 12/286,141, filed Sep. 29, 2008; "ELECTRONIC ELEMENT HAVING CARBON NANOTUBES", Ser. No. 12/286,143, filed Sep. 29, 2008; "TOUCH PANEL AND DISPLAY DEVICE USING THE SAME", Ser. No. 12/286,166, filed Sep. 29, 2008; "TOUCH PANEL AND DISPLAY DEVICE USING THE SAME", Ser. No. 12/286,178, filed Sep. 29, 2008; "TOUCH PANEL AND DISPLAY DEVICE USING THE SAME", Ser. No. 12/286,148, filed Sep. 29, 2008; "TOUCHABLE CONTROL DEVICE", Ser. No. 12/286,140, filed Sep. 29, 2008; "TOUCH PANEL AND DISPLAY DEVICE USING THE SAME", Ser. No. 12/286,146, filed Sep. 29, 2008; "TOUCH PANEL AND DISPLAY DEVICE USING THE SAME", Ser. No. 12/286,216, filed Sep. 29, 2008; "TOUCH PANEL AND DISPLAY DEVICE USING THE SAME", Ser. No. 12/286,152, filed Sep. 29, 2008; "TOUCH PANEL AND DISPLAY DEVICE USING THE SAME", Ser. No. 12/286,145, filed Sep. 29, 2008; "TOUCH PANEL, METHOD FOR MAKING THE SAME, AND DISPLAY DEVICE ADOPTING THE SAME", Ser. No. 12/286,155, filed Sep. 29, 2008; "TOUCH PANEL AND DISPLAY DEVICE USING THE SAME", Ser. No. 12/286,179, filed Sep. 29, 2008; "TOUCH PANEL, METHOD FOR MAKING THE SAME, AND DISPLAY DEVICE ADOPTING THE SAME", Ser. No. 12/286,228, filed Sep. 29, 2008; "TOUCH PANEL AND DISPLAY DEVICE USING THE SAME", Ser. No. 12/286,153, filed Sep. 29, 2008; "TOUCH PANEL AND DISPLAY DEVICE USING THE SAME", Ser. No. 12/286,184, filed Sep. 29, 2008; "METHOD FOR MAKING TOUCH PANEL", Ser. No. 12/286,175, filed Sep. 29, 2008; "METHOD FOR MAKING TOUCH PANEL", Ser. No. 12/286,195, filed Sep. 29, 2008; "TOUCH PANEL AND DISPLAY DEVICE USING THE SAME", Ser. No. 12/286,160, filed Sep. 29, 2008; "TOUCH PANEL AND DISPLAY DEVICE USING THE SAME", Ser. No. 12/286,220, filed Sep. 29, 2008; "TOUCH PANEL AND DISPLAY DEVICE USING THE SAME", Ser. No. 12/286,227, filed Sep. 29, 2008; "TOUCH PANEL AND DISPLAY DEVICE USING THE SAME", Ser. No. 12/286,144, filed Sep. 29, 2008; "TOUCH PANEL AND DISPLAY DEVICE USING THE SAME", Ser. No. 12/286,218, filed Sep. 29, 2008; "TOUCH PANEL AND DISPLAY DEVICE USING THE SAME", Ser. No. 12/286,142, filed Sep. 29, 2008; "TOUCH PANEL AND DISPLAY DEVICE USING THE SAME", Ser. No. 12/286,241, filed Sep. 29, 2008; "TOUCH PANEL, METHOD FOR MAKING THE SAME, AND DISPLAY DEVICE ADOPTING THE SAME", Ser. No. 12/286,151, filed Sep. 29, 2008; and "TOUCH PANEL, METHOD FOR MAKING THE SAME, AND DISPLAY DEVICE ADOPTING THE SAME", Ser. No. 12/286,219, filed Sep. 29, 2008. The disclosures of the above-identified applications are incorporated herein by reference.

BACKGROUND

1. Field of the Invention

The present invention relates to touch panels and, particularly, to a carbon nanotube based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, a stylus, or another like tool while visually observing the display device through the touch panel. Therefore, a demand exists for touch panels that provide superior visibility and reliable operation.

Up to the present time, different types of touch panels, including resistance, capacitance, infrared, and surface sound-wave types have been developed. The capacitance-type touch panel has advantages such as higher accuracy and excellent transparency, and thus has been widely used.

There are two kinds of conventional capacitance-type touch panels: the single-point capacitance-type touch panel, and the multipoint capacitance-type touch panel. The multipoint capacitance-type touch panel includes a glass substrate, a plurality of transparent conductive layers, a capacitive sensing circuit, and a plurality of sense traces. The transparent conductive layers and the sense traces are separately disposed on a surface of the glass substrate. The transparent conductive layers are placed at different locations on the surface of the glass substrate. Each transparent conductive layer is electrically connected to the capacitive sensing circuit by a respective sense trace. The capacitive sensing circuit includes at least one integrated circuit recording positions of the transparent conductive layers. The material of the transparent conductive layers and the sense traces is selected from a group consisting of indium tin oxide (ITO) and antimony tin oxide (ATO). Additionally, a filling layer is formed in gaps between the adjacent transparent conductive layers and the adjacent sense traces. The material of the filling layer has a refractive index similar to the material of the transparent conductive layers. As such, the touch panel with the filling layer can provide uniform transparency. Further, a protective layer is formed on the surface of the transparent conductive layer that faces away from the substrate. The material of the protective layer has insulative and transparent characteristics.

In typical operation, an upper surface of the touch panel is pressed/touched with one or more touch tools simultaneously. The touch tools can for example be one or more fingers of a user or several users. Visual observation of a screen on the liquid crystal display device provided on a backside of the touch panel is provided. For example, in the case where a user touches the upper surface with two fingers simultaneously, due to an electrical field of the user, coupling capacitances form between the user's fingers and the transparent conductive layers. For high frequency electrical current, the coupled capacitances act as conductors, and thus the user's fingers take away currents from the touch points. Currents flowing through the capacitive sensing circuit cooperatively replace the currents lost at the touch points. Thus the positions of the touch points can be simultaneously identified by the integrated circuit of the capacitive sensing circuit.

The transparent conductive layers (e.g., ITO layers) are generally formed by means of ion-beam sputtering, and this method is relatively complicated. Furthermore, the ITO layers have generally poor mechanical durability, low chemical endurance, and uneven resistance over an entire area of the touch panel. Additionally, the ITO layers have relatively low transparency. All the above-mentioned problems of the ITO layers tend to yield a touch panel with relatively low sensitivity, accuracy, and brightness.

What is needed, therefore, is a touch panel having good durability, and providing high sensitivity, accuracy, and brightness. What is also needed is a display device using such touch panel.

SUMMARY

In one embodiment, a touch panel includes a substrate, a plurality of transparent conductive layers, at least one capacitive sensing circuit, and a plurality of conductive wires. The transparent conductive layers are disposed on a surface of the substrate and spaced apart from each other. At least one transparent conductive layer includes a carbon nanotube layer. The carbon nanotube layer includes a plurality of carbon nanotubes. The conductive wires respectively electrically connect the transparent conductive layers to the at least one capacitive sensing circuit.

Other novel features and advantages of the present touch panel and display device using the same will become more apparent from the following detailed description of exemplary embodiments, when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Figure 1:
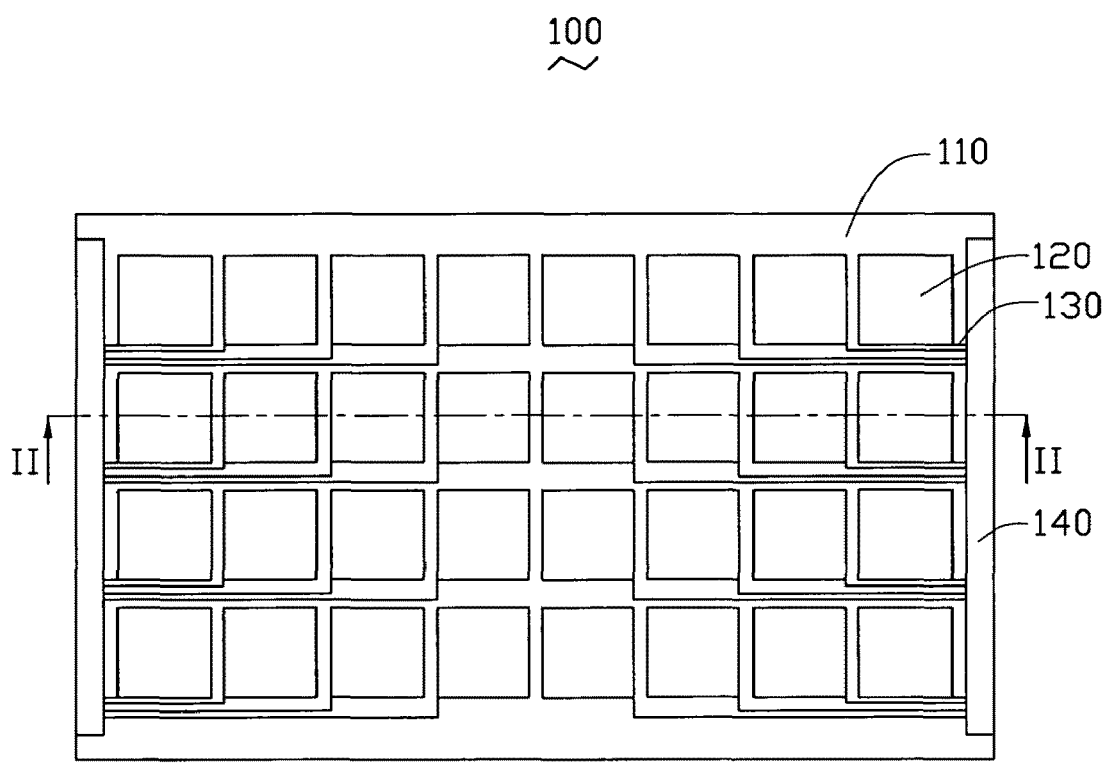
FIG. 1 is a top plan view of a touch panel in accordance with a present embodiment.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and display device using the same.

Figure 2:
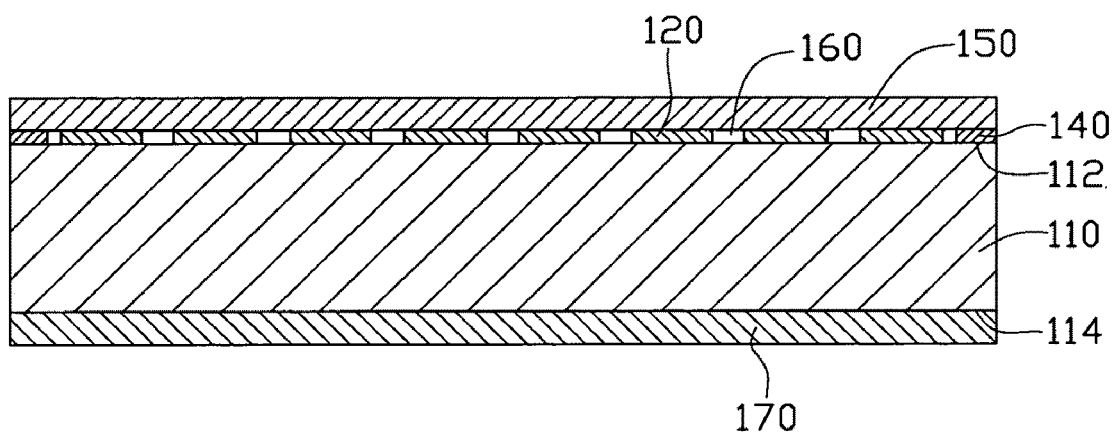
FIG. 2 is a side cross-sectional view of the touch panel of FIG. 1, taken along a line II-II thereof.

Referring to FIG. 1 and FIG. 2, a touch panel 100 includes a substrate 110, a plurality of transparent conductive layers 120, a plurality of conductive wires 130, at least one capacitive sensing circuit 140, a transparent protective film 150, and a filling layer 160. The substrate 110 has a first surface 112 and a second surface 114 at opposite top and bottom sides thereof respectively. The transparent conductive layers 120 and the conductive wires 130 are disposed on the first surface 112 of the substrate 110. All the transparent conductive layers 120 are spaced apart from each other and electrically isolated from each other. That is, transparent conductive layers 120 are arranged in a matrix with gaps defined therebetween. In the illustrated embodiment, there are two capacitive sensing circuits 140, which are positioned at opposite ends of the first surface 112 respectively. The conductive wires 130 are positioned in the gaps between the transparent conductive layers 120, and respectively connect the transparent conductive layers 120 to the corresponding capacitive sensing circuits 140. The filling layer 160 is formed in the gaps between the transparent conductive layers 120 and the conductive wires 130. The transparent protective film 150 covers the transparent conductive layers 120, the conductive wires 130, and the filling layer 160.

The substrate 110 is a transparent plate and can be made of rigid material such as glass, quartz, or diamond, or flexible material such as polymer or resin. When the substrate 110 is flexible, the material thereof can be selected from a group consisting of polycarbonate (PC), polymethyl methacrylate (PMMA), polyethylene terephthalate (PET), polyether sulfone (PES), polyvinyl chloride (PVC), benzocyclobutene (BCB), polyester, and acrylic resin. A thickness of the substrate 110 can be in the approximate range from 1 millimeter to 1 centimeter. In the present embodiment, the substrate 110 is made of glass, and the thickness thereof is about 2 millimeters. Understandably, the substrate 110 is used to support the transparent conductive layers 120. Thus the material of the substrate 110 is not restricted to the above-mentioned materials, and can be any other suitable transparent material.

It is to be noted that the shape of the substrate 110 is chosen according to the requirements of the touch field (i.e., sensing area) of the touch panel 100. A shape of the sensing area of the touch panel 100 can be arbitrarily set (e.g., a rectangular area, or a triangular area). In the present embodiment, the shapes of the touch field and the substrate 110 are both rectangular.

The transparent conductive layers 120 can be arranged randomly or orderly on the first surface 112 of the substrate 110. Each transparent conductive layer 120 corresponds to a reference point on the touch panel 100. When the transparent conductive layers 120 are orderly, they can be positioned according to any particular desired pattern, with their positions depending on the coordinate system used. For example, the transparent conductive layers 120 can be arranged in an array of rows and columns for a Cartesian coordinate system. In another example, the transparent conductive layers 120 can be arranged in an array of concentric and radial segments for a polar coordinate system. The shapes of the transparent conductive layers 120 can be arbitrarily set, such as squares, circles, ovals, triangles, rectangles, and polygons. The shapes and sizes of the transparent conductive layers 120 can be the same or different, according to actual needs. It is to be understood that in order to improve the resolution of the touch panel 100, the number of transparent conductive layers 120 is large, while the sizes of the transparent conductive layers 120 are small. Typically, the sizes of the transparent conductive layers 120 are smaller than the size of a fingertip. For example, a uniform size of the transparent conductive layers 120 can be on the order of 4 to 5 square millimeters. It is to be noted that the shapes of the transparent conductive layers 120 are generally chosen to maximize the sensing area and to minimize optical differences between the gaps and the transparent conductive layers 120. Typically, widths of the gaps between the transparent conductive layers 120 are in the approximate range from 1 micron to 5 millimeters.

In the present embodiment, the transparent conductive layers 120 are square, and are arranged in an array of rows and columns. The squares are about 5 millimeters long on each side. The gaps between adjacent columns of the transparent conductive layers 120 are in the approximate range from 1 micron to 5 millimeters. The gaps between adjacent rows of the transparent conductive layers 120 are about 100 microns.

Each transparent conductive layer 120 includes a carbon nanotube layer. The carbon nanotube layer is formed by a plurality of carbon nanotubes, ordered or otherwise, and has a substantially uniform thickness. The carbon nanotube layer can include one transparent carbon nanotube film, or a plurality of coplanar or stacked transparent carbon nanotube films. A thickness of the carbon nanotube layer can be arbitrary set to any thickness that provides acceptable transparency. In the following description, unless the context indicates otherwise, it will be assumed that the carbon nanotube layer of each transparent conductive layer 120 includes only one carbon nanotube film.

The carbon nanotube film can be an ordered film or a disordered film. In the ordered film, the carbon nanotubes are oriented along a same direction or different directions. In the disordered film, the carbon nanotubes are disordered or isotropic. The disordered carbon nanotubes are randomly entangled with each other. The isotropic carbon nanotubes are parallel to a surface of the carbon nanotube film.

A length and a width of the carbon nanotube film can be arbitrarily set as desired. A thickness of the carbon nanotube film is in an approximate range from 0.5 nanometers to 100 micrometers. The carbon nanotubes in the carbon nanotube film can include single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers.

In the present embodiment, each transparent conductive layer 120 is formed of the carbon nanotube layer. The carbon nanotube layer includes one carbon nanotube film. The carbon nanotube film is ordered, with the carbon nanotubes therein aligned along a same direction. More specifically, the carbon nanotube film includes a plurality of successive and oriented carbon nanotubes joined end to end by van der Waals attractive force. An alignment direction of the carbon nanotube film is arbitrarily set. In another embodiment, when there are plural stacked carbon nanotube films and each of films has ordered carbon nanotubes therein aligned along a same direction, the respective alignment directions of each carbon nanotube film are set as desired. For example, an angle between the arranged directions of the carbon nanotubes in two adjacent stacked carbon nanotube films is in the range between and including 0° and 90°. The placing the films at an angle helps increase the strength of the overall structure. Having the films aligned will increase the efficienty of the transmission.

Figure 3:
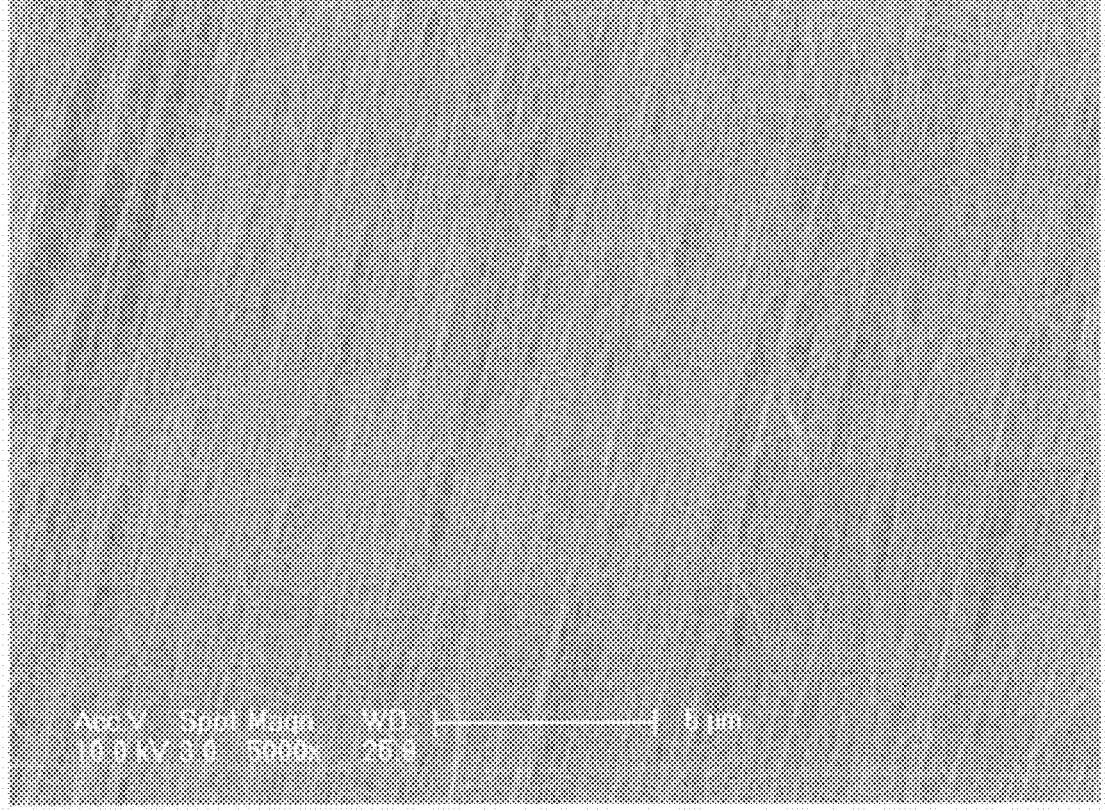
FIG. 3 shows a Scanning Electron Microscope (SEM) image of a carbon nanotube film used in the touch panel of FIG. 1.
Figure 4:
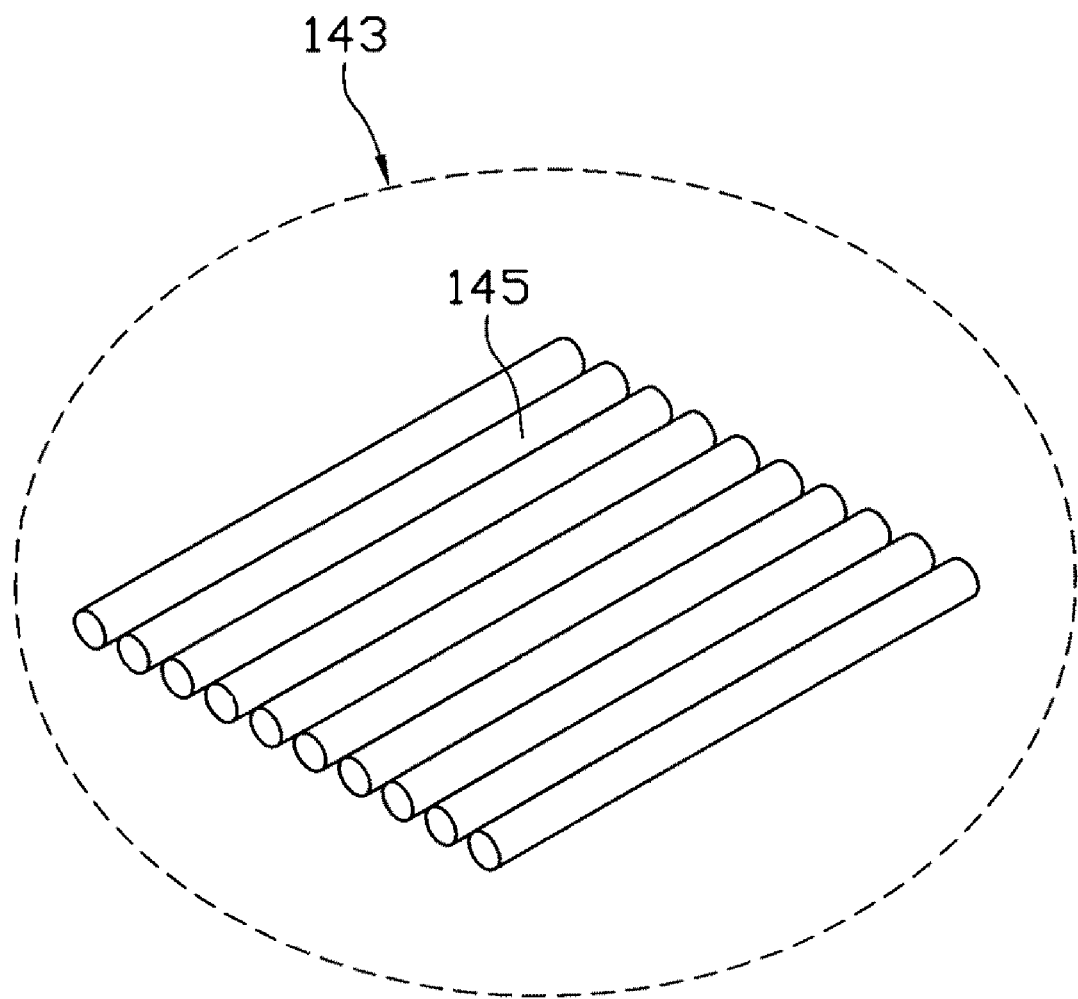
FIG. 4 is a structural schematic of a carbon nanotube segment.

Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. A length and a width of the carbon nanotube film can be arbitrarily set as desired. A thickness of the carbon nanotube film approximately ranges from 0.5 nanometers to 100 micrometers. A distance between adjacent carbon nanotube structures can be in an approximate range from 5 nanometers to 1 millimeter. The carbon nanotubes 145 in the carbon nanotube structures can be selected from a group consisting of single-walled carbon nanotubes, double-walled carbon nanotubes, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers.

A method for fabricating the above-described carbon nanotube film includes the steps of: (a) providing an array of carbon nanotubes, specifically, a super-aligned array of carbon nanotubes; and (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the array can be single-walled carbon nanotubes, double-walled carbon nanotubes, or multi-walled carbon nanotubes. Diameters of the single-walled carbon nanotubes are in the approximate range from 0.5 nanometers to 50 nanometers. Diameters of the double-walled carbon nanotubes are in the approximate range from 1 nanometer to 50 nanometers. Diameters of the multi-walled carbon nanotubes are in the approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (b), the carbon nanotube film, can be formed by the substeps of: (b1) selecting one or more carbon nanotubes having a predetermined width from the array of carbon nanotubes; and (b2) pulling the carbon nanotubes to form nanotube segments 143 at an even/uniform speed to achieve a uniform carbon nanotube film.

In step (b1), quite usefully, the carbon nanotube segment 143 includes a plurality of carbon nanotubes 145 parallel to each other. The carbon nanotube segments 143 can be selected by using an adhesive tape as the tool to contact the super-aligned array of carbon nanotubes. In step (b2), the pulling direction is substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. Referring to FIG. 3, the carbon nanotube film includes a plurality of carbon nanotubes joined ends to ends. The carbon nanotubes in the carbon nanotube film are all substantially parallel to the pulling/drawing direction of the carbon nanotube film, and the carbon nanotube film produced in such manner can be selectively formed to have a predetermined width. The carbon nanotube film formed by the pulling/drawing method has superior uniformity of thickness and conductivity over a typical disordered carbon nanotube film. Further, the pulling/drawing method is simple, fast, and suitable for industrial applications.

The width of the carbon nanotube film depends on a size of the carbon nanotube array. The length of the carbon nanotube film can be set as desired. When the substrate is a 4-inch P-type silicon wafer as in the present embodiment, the width of the carbon nanotube film is in an approximate range from 0.01 centimeters to 10 centimeters, and the thickness of the carbon nanotube film is in an approximate range from 0.5 nanometers to 100 microns. The carbon nanotubes in the carbon nanotube film include single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in an approximate range from 0.5 to 50 nanometers, 1 to 50 nanometers, and 1.5 to 50 nanometers.

It is noted that because the carbon nanotubes in the super-aligned carbon nanotube array have a high purity and a high specific surface area, the carbon nanotube film is adherent in nature. As such, the carbon nanotube film can be directly adhered to the first surface 112 of the substrate 110 without the use of an adhesive. In the alternative, other bonding means can be applied.

It is to be understood that when the size of the as-formed carbon nanotube film is larger than the size of each transparent conductive layers 120, the carbon nanotube film can be cut into needed sizes and shapes by a laser cutting process performed in air. The cutting can be performed before or after the adhering step. For example, after being adhered on the substrate 110, the carbon nanotube film can be cut and formed into a plurality of transparent conductive layers 120. In the following description, unless the context indicates otherwise, it will be assumed that a single carbon nanotube film is adhered on the substrate 110 prior to a cutting step.

Once the carbon nanotube film is adhered to the first surface 112 of the substrate 110, the carbon nanotube film can be treated with an organic solvent. Specifically, the organic solvent can be applied onto the carbon nanotube film to soak the entire surface of the carbon nanotube film. Specifically, the carbon nanotube film can be treated by applying organic solvent to the carbon nanotube film to soak the entire surface of the carbon nanotube film. The organic solvent is volatile and can be selected from the group consisting of ethanol, methanol, acetone, dichloroethane, chloroform, any appropriate mixture thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate will come into contact with the first surface 112 of the substrate 110 after the organic solvent treatment due to the surface tension of the organic solvent. Then the contacting area of the carbon nanotube film with the substrate will increase, and thus, the carbon nanotube film can firmly adhere to the first surface 112 of the substrate 110. In another aspect, due to the decrease of the specific surface area via bundling, the mechanical strength and toughness of the carbon nanotube film are increased and the coefficient of friction of the carbon nanotube films is reduced. Macroscopically, the film will be an approximately uniform carbon nanotube film. After such treatment with organic solvent, the carbon nanotube film can be cut and formed into a plurality of transparent conductive layers 120 (see above). Alternatively, the carbon nanotube film can be cut and formed into a plurality of transparent conductive layers 120 prior to treatment with organic solvent.

Unlike previous methods for making an ITO film, the present method does not require a vacuum environment and heat processing, due to the carbon nanotube film being obtained by being pulled out from an array of carbon nanotubes. Thus, the carbon nanotube layers formed of one or more carbon nanotube films and used in the transparent conductive layers 120 have the advantage of being low cost, environmentally safe, and energy efficient.

The conductive wires 130 are positioned in the gaps. In the illustrated embodiment, the conductive wires 130 are routed from the transparent conductive layers 120 to the corresponding capacitive sensing circuits 140 positioned at the opposite ends of the touch panel 100. According to this arrangement, the conductive wires 130 can be routed in a variety of ways. Typically, to reduce the sizes of the gaps between the adjacent transparent conductive layers 120 and the resistances of the conductive wires 130, the conductive wires 130 are routed along paths between the transparent conductive layers 120 and the capacitive sensing circuits 140 whereby minimal distances are traversed. The conductive wires 130 can be formed from ITO, ATO, conductive resin, or any other suitable transparent conductive material. The conductive wires 130 are formed on the first surface 112 of the substrate 110 using any suitable patterning technique (e.g., deposition, etching, or printing). A diameter of the conductive wires 130 is less than 100 microns. In the present embodiment, the conductive wires 130 are formed by a plurality of carbon nanotube wires. The method for fabricating the carbon nanotube wires is similar to the method for fabricating the above-described carbon nanotube film. A diameter of each of the carbon nanotube wires is in the approximate range from 0.5 nanometers to 100 microns. The carbon nanotube wires include a plurality of carbon nanotubes joined end to end. It is noted that because the carbon nanotubes in the super-aligned carbon nanotube array have a high purity and a high specific surface area, the carbon nanotube wires are adherent in nature. As such, the carbon nanotube wires can be directly adhered to the first surface 112 of the substrate 110.

In the present embodiment, two capacitive sensing circuits 140 are respectively disposed on a first end and a second end of the first surface 112 of the substrate 110. The first and second ends are opposite ends of the first surface 112. The conductive wires 130 are disposed in gaps between rows of the transparent conductive layers 120. The transparent conductive layers 120 closer to the first end are respectively connected to the capacitive sensing circuit 140 on the first end. The transparent conductive layers 120 closer to the second side are respectively connected to the capacitive sensing circuit 140 on the second end. In other embodiments, the at least one capacitive sensing circuit 140 can be positioned at least one edge and/or corner of the touch panel 100 or in any acceptable location. For example, several capacitive sensing circuits 140 can be positioned on the edges or corners of the touch panel 100 to provide minimum distances between the transparent conductive layers 120 and the capacitive sensing circuits 140.

Each capacitive sensing circuit 140 includes at least one integrated circuit (IC, not shown). The IC stores the position coordinates of the corresponding transparent conductive layers 120, and measures the capacitive changes at the corresponding transparent conductive layers 120. Further, the IC can transmit information on the capacitive changes and the corresponding position coordinates to other electronic devices (see below).

Further, the gaps between the transparent conductive layers 120 and the conductive wires 130 are air gaps unless or until they are filled. The gaps do not have the same refractive index and transmissivity as the transparent conductive layers 120 and the conductive wires 130. Thus, the filling layer 160 is formed in the gaps between the transparent conductive layers 120 and the conductive wires 130 to improve the visual appearance of the touch panel 100. The filling layer 160 is formed of a material with a refractive index and a transmissivity similar to that of the transparent conductive layers 120 and the conductive wires 130.

Further, in order to prolong operational life span and restrict coupling capacitances of the touch panel 100, the transparent protective film 150 is disposed on the transparent conductive layers 120 and the filling layer 160. The transparent protective film 150 can be a plastic film and receives a surface hardening treatment to protect the transparent conductive layers 120 and the filling layer 160 from being scratched when in use. The transparent protective film 150 can be adhered to the transparent conductive layers 120 and the filling layer 160; or can be combined with the transparent conductive layers 120 and the filling layer 160 by a hot-pressing method. The material of the transparent protective film 150 can be selected from a group consisting of silicon nitride, silicon dioxide, BCB, polyester, acrylic resin, PET, and any combination thereof.

In the present embodiment, the material of the transparent protective film 150 is PET. The hardness and thickness of the transparent protective film 150 are selected according to practical needs. The transparent protective film 150 is adhered to the transparent conductive layers 120 and the filling layer 160.

Figure 5:
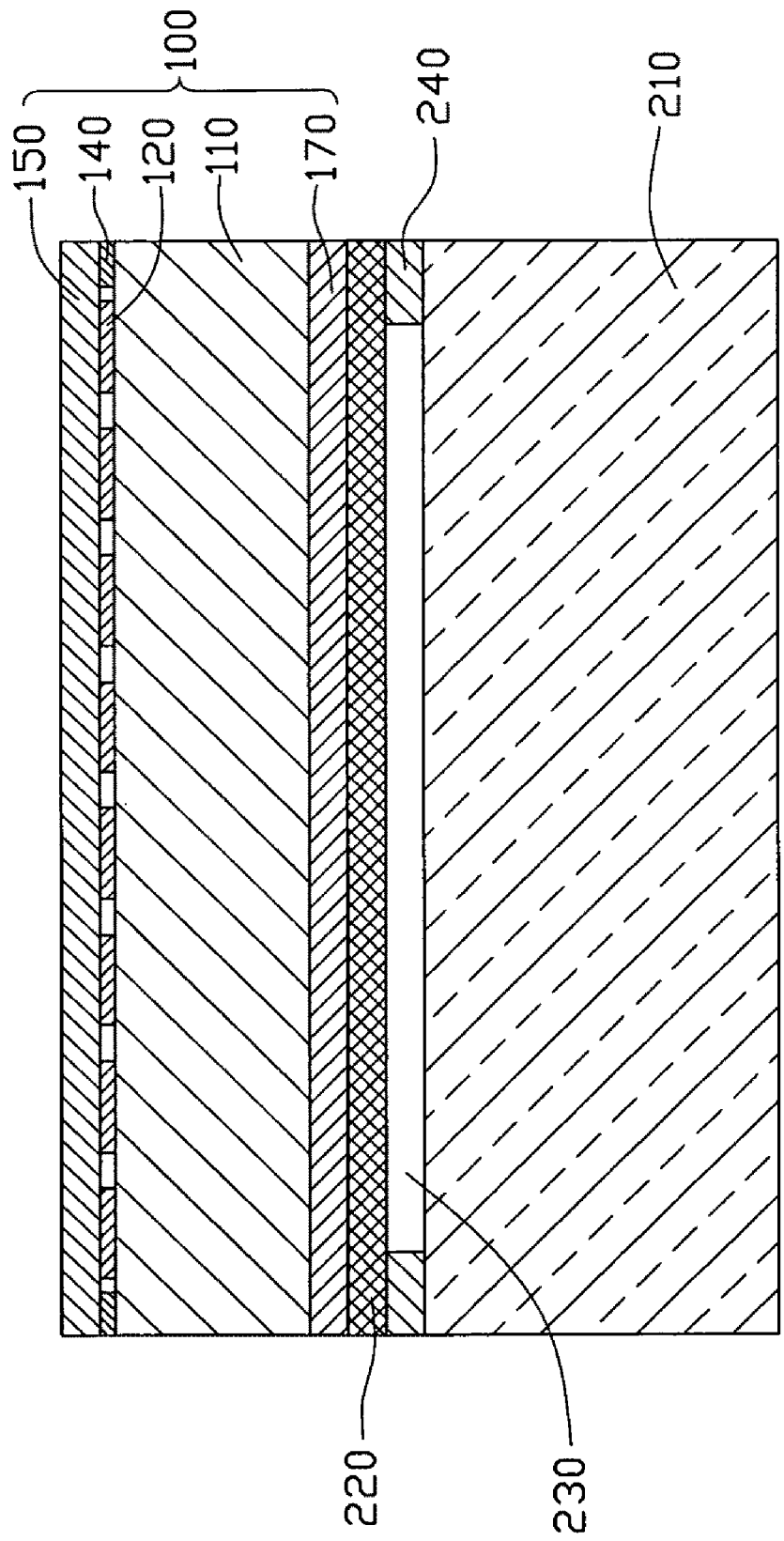
FIG. 5 is essentially a schematic cross-sectional view of the touch panel of the present embodiment used with a display element of a display device.

Referring also to FIG. 5, the touch panel 100 can further include a shielding layer 170 disposed on the second surface 114 of the substrate 110. The material of the shielding layer 170 can be ITO film, ATO film, conductive resin film, carbon nanotube film, or another suitable conductive film. In the present embodiment, the shielding layer 170 is a carbon nanotube film. The carbon nanotube film includes a plurality of carbon nanotubes, and the orientations of the carbon nanotubes therein can be arbitrarily determined. In the present embodiment, the carbon nanotubes in the carbon nanotube film of the shielding layer 170 are arranged along a same direction. The carbon nanotube film is connected to ground and acts as shielding, thus enabling the touch panel 100 to operate without interference (e.g., electromagnetic interference).

Figure 6:
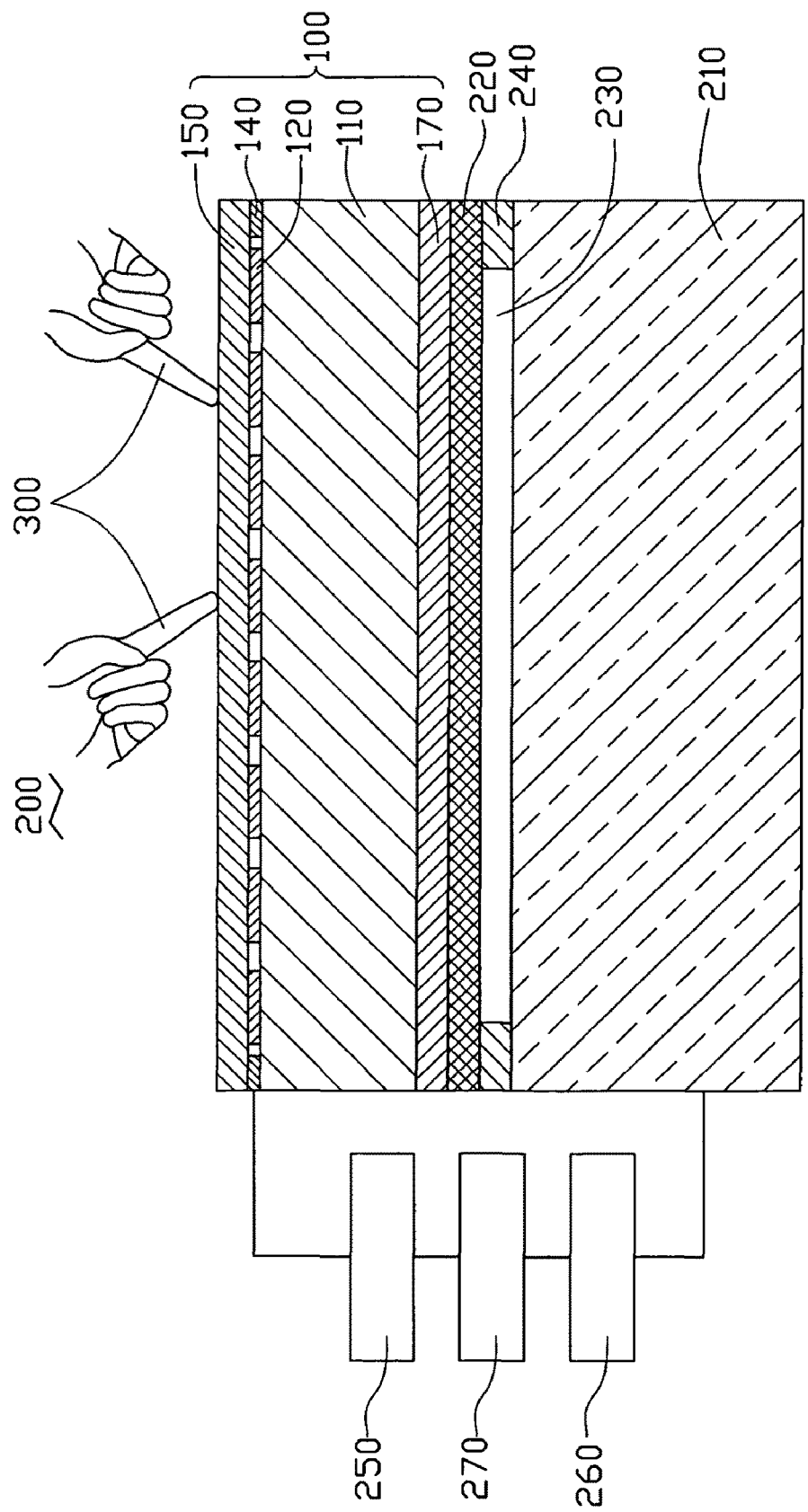
FIG. 6 is similar to FIG. 5, but also showing other components of the display device, and showing the touch panel in use.

Referring to FIGS. 5 and 6, an exemplary display device 200 includes the touch panel 100, a display element 210, a touch panel controller 250, a central processing unit (CPU) 270, and a display element controller 260. The touch panel 100 is opposite and adjacent to the display element 210. The touch panel 100 can be spaced from the display element 210 or installed directly on the display element 210. The touch panel 100 is connected to the touch panel controller 250 by a circuit external to the touch panel 100. The touch panel controller 250, the CPU 270 and the display element controller 260 are electrically connected. In particular, the CPU 270 is connected to the display element controller 260 to control the display element 210.

The display element 210 can be, e.g., a conventional display such as a liquid crystal display, field emission display, plasma display, electroluminescent display, vacuum fluorescent display, cathode ray tube, or another display device, or a flexible display such as an e-paper (i.e., a microencapsulated electrophoretic display), a flexible liquid crystal display, a flexible organic light emitting display (OLED), or any other flexible display.

When the shielding layer 170 is disposed on the second surface 114 of the substrate 110, a passivation layer 220 is disposed on a surface of the shielding layer 170 that faces away from the substrate 110. The material of the passivation layer 220 can be selected from a group consisting of silicon nitride, silicon dioxide, benzocyclobutene, polyester, acrylic resin, polyethylene terephthalate, and any combination thereof. The passivation layer 220 can be spaced at a distance from the display element 210, or can be directly installed on the display element 210. When the passivation layer 220 is spaced at a distance from the display element 210, understandably, two or more spacers 240 can be used. Thereby, a gap 230 is provided between the passivation layer 220 and the display element 210. The passivation layer 220 protect the shielding layer 170 from chemical damage (e.g., humidity of the surrounding) or mechanical damage (e.g., scratching during fabrication of the touch panel).

In operation, an upper surface of the touch panel 100 is pressed/touched with one or more touch tools 300 simultaneously. The touch tools 300 can for example be one or more fingers of a user. For example, in the case where a user touches the upper surface with two fingers simultaneously, due to an electrical field of the user, coupling capacitances form between the user's fingers and the corresponding transparent conductive layers 120. For high frequency electrical current, the coupled capacitances are conductors, and thus the user's fingers take away currents from the touch points. Currents flowing through either or both of the corresponding capacitive sensing circuits 140 cooperatively replace the currents lost at the touch points. The position coordinates of the touch points can be identified by the IC of either or both (simultaneously) of the corresponding capacitive sensing-circuits 140. This information is transmitted in analog form to the touch panel controller 250. The touch panel controller 250 converts the analog capacitive changes and position coordinates to digital data. The CPU 270 receives the digital data, and sends corresponding commands to the display element controller 260 to control the display element 210 accordingly.

The carbon nanotube layers provided in the present embodiment have superior properties, such as excellent toughness, high mechanical strength, and uniform conductivity. Thus, the touch panel 100 and the display device 200 are durable and highly conductive. In addition, the pulling method for fabricating the carbon nanotube films for the carbon nanotube layers is simple, and the adhesive carbon nanotube films can be disposed on the substrate 110 directly without the use of an adhesive. As such, the method for fabricating the carbon nanotube films is suitable for the mass production of touch panels and display devices using the same, and reduces the costs thereof. Furthermore, the carbon nanotube films have high transparency, thereby promoting improved brightness of the touch panel 100 and the display device 200. Moreover, since the carbon nanotubes have excellent electrical conductivity properties, the carbon nanotube layers formed by the plurality of carbon nanotubes have a uniform resistance distribution. Thus the touch panel 100 and the display device 200 adopting the carbon nanotube layers have improved sensitivity and accuracy.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A touch panel comprising:
a substrate comprising a surface;
a plurality of transparent conductive layers disposed on the surface of the substrate and spaced apart from each other, at least one of the plurality of transparent conductive layers comprising a carbon nanotube layer;
at least one capacitive sensing circuit; and
a plurality of conductive wires respectively electrically connecting the plurality of transparent conductive layers to the at least one capacitive sensing circuit, the at least one capacitive sensing circuit measuring capacitive changes of the plurality of transparent conductive layers,
wherein the carbon nanotube layer comprises at least one carbon nanotube film, the at least one carbon nanotube film comprises a plurality of carbon nanotubes, and a majority of the plurality of carbon nanotubes of the carbon nanotube film are aligned along a same direction.

2. The touch panel as claimed in claim 1, wherein the at least one carbon nanotube film comprises a plurality of successive carbon nanotube segments joined end to end by van der Waals attractive force therebetween.

3. The touch panel as claimed in claim 2, wherein the carbon nanotube layer comprises a plurality of carbon nanotube films directly stacked with each other, the plurality of carbon nanotubes in each of the plurality of carbon nanotube films are aligned along a same direction, and an angle between the aligned direction of the carbon nanotubes in two adjacent stacked carbon nanotube films is greater than 0° and up to 90°.

4. The touch panel as claimed in claim 1, wherein a thickness of the at least one carbon nanotube film is in an approximate range from 0.5 nanometers to 100 microns.

5. The touch panel as claimed in claim 1, wherein the plurality of transparent conductive layers are arranged in an array of rows and columns or an array of concentric and radial segments.

6. The touch panel as claimed in claim 1, wherein the plurality of conductive wires comprise a material selected from the group consisting of indium tin oxide, antimony tin oxide, carbon nanotubes, and conductive resin.

7. The touch panel as claimed in claim 1, further comprising a filling layer located in gaps between the plurality of transparent conductive layers and the plurality of conductive wires.

8. The touch panel as claimed in claim 7, wherein the filling layer is formed of material with a refractive index and a transmissivity similar to those of the transparent conductive layers and the conductive wires.

9. The touch panel as claimed in claim 1, further comprising a transparent protective film disposed on surfaces of the plurality of transparent conductive layers facing away from the substrate, material of the transparent protective film being selected from the group consisting of silicon nitride, silicon dioxide, benzocyclobutene, polyester, acrylic resin, polyethylene terephthalate, and any combination thereof.

10. The touch panel as claimed in claim 1, further comprising a shielding layer disposed on another surface of the substrate that faces away from the plurality of transparent conductive layers, material of the shielding layer being selected from the group consisting of indium tin oxide film, antimony tin oxide film, conductive resin film, carbon nanotube film, and any combination thereof, the carbon nanotube film of the shielding layer comprises a plurality of carbon nanotubes aligned along a same direction.

11. A display device comprising:
a touch panel comprising a substrate, a plurality of transparent conductive layers disposed on a surface of the substrate, at least one capacitive sensing circuit, and a plurality of conductive wires respectively electrically connecting the plurality of transparent conductive layers to the at least one capacitive sensing circuit, at least one of the plurality of transparent conductive layers comprising a carbon nanotube layer, and the carbon nanotube layer comprising at least one carbon nanotube film, the at least one carbon nanotube film comprising a plurality of carbon nanotubes, a majority of the plurality of carbon nanotubes of the carbon nanotube film are aligned along the same direction and joined end to end by van der Waals attractive force; and
a display element is adjacent to the touch panel.

12. The display device as claimed in claim 11, further comprising a first controller configured for controlling the touch panel, a central processing unit, and a second controller configured for controlling the display element, the first controller, the central processing unit and the second controller being electrically connected with each other, the display element being connected to the second controller, and the touch panel being connected to the first controller.

13. The display device as claimed in claim 11, wherein the display element is selected from the group consisting of liquid crystal displays, field emission displays, plasma displays, electroluminescent displays, vacuum fluorescent displays, cathode ray tubes, e-papers, flexible liquid crystal displays, and flexible organic light emitting displays.

14. The display device as claimed in claim 11, wherein the touch panel is installed directly on the display element.

15. A touch panel comprising:
a substrate comprising a first surface and a second surface opposite to the first surface;
a plurality of transparent conductive layers disposed directly on the first surface of the substrate and spaced apart from each other, at least one of the plurality of transparent conductive layers comprising a first carbon nanotube film;

a shielding layer disposed directly on the second surface of the substrate, the shielding layer comprising a second carbon nanotube film;

at least one capacitive sensing circuit; and a plurality of conductive wires electrically connecting the plurality of transparent conductive layers to the at least one capacitive sensing circuit, the at least one capacitive sensing circuit measuring capacitive changes of the plurality of transparent conductive layers, wherein the first carbon nanotube film and the second carbon nanotube film each comprise a plurality of carbon nanotubes, and a majority of the plurality of carbon nanotubes of the first and second carbon nanotube films are aligned along a same direction.

* * * * *